(12) United States Patent
Laughlin

(10) Patent No.: US 8,333,357 B2
(45) Date of Patent: Dec. 18, 2012

(54) ADJUSTABLE LENGTH LANYARD

(75) Inventor: Patrick John Laughlin, Thousand Oaks, CA (US)

(73) Assignee: Cooper Technologies Company, Houston, TX (US)

( * ) Notice: Subject to any disclaimer, the term of this patent is extended or adjusted under 35 U.S.C. 154(b) by 264 days.

(21) Appl. No.: 12/721,805

(22) Filed: Mar. 11, 2010

(65) Prior Publication Data
US 2010/0230572 A1 Sep. 16, 2010

Related U.S. Application Data

(60) Provisional application No. 61/160,516, filed on Mar. 16, 2009.

(51) Int. Cl.
*A47H 1/10* (2006.01)

(52) U.S. Cl. ........... 248/328; 254/391; 182/5; 24/134 R; 188/65.1

(58) Field of Classification Search .................. 248/328; 182/111, 192, 235, 5; 24/115 R, 134 R, 116 A; 188/65.2, 188; 254/391
See application file for complete search history.

(56) References Cited

U.S. PATENT DOCUMENTS

| | | | | |
|---|---|---|---|---|
| 3,179,994 A | * | 4/1965 | Meyer et al. | 24/134 R |
| 3,386,530 A | * | 6/1968 | Thompson | 182/112 |
| 3,492,702 A | * | 2/1970 | Stafford | 403/104 |
| 3,589,052 A | * | 6/1971 | King | 43/44.88 |
| 3,811,155 A | * | 5/1974 | Stafford | 24/115 G |
| 3,840,212 A | * | 10/1974 | Latanision | 248/329 |
| 3,876,036 A | * | 4/1975 | Sweet | 182/18 |
| 3,886,631 A | * | 6/1975 | Caradot | 24/134 N |
| 3,948,362 A | * | 4/1976 | Greest | 188/65.2 |
| 4,034,828 A | * | 7/1977 | Rose et al. | 182/5 |
| 4,071,926 A | * | 2/1978 | Sweet et al. | 24/136 R |
| 4,077,094 A | * | 3/1978 | Swager | 24/134 R |
| 4,225,012 A | * | 9/1980 | Hindle | 182/112 |
| 4,465,011 A | * | 8/1984 | Merry | 114/199 |
| 4,521,000 A | * | 6/1985 | Dodge, Jr. | 254/391 |
| 4,542,884 A | * | 9/1985 | Dodge, Jr. | 254/391 |
| 4,560,029 A | * | 12/1985 | Dalmaso | 182/5 |
| 4,576,248 A | * | 3/1986 | Marom | 182/5 |
| 4,598,442 A | * | 7/1986 | Luginbuhl | 24/132 R |
| 4,657,110 A | * | 4/1987 | Wolner | 182/5 |
| 4,669,582 A | * | 6/1987 | Sandreid | 188/65.1 |
| 4,813,469 A | * | 3/1989 | Scott | 160/178.2 |
| 4,830,340 A | * | 5/1989 | Knitig | 254/391 |
| 4,912,817 A | * | 4/1990 | Sandreid | 24/132 R |
| 4,958,415 A | | 9/1990 | Johnson | |
| 5,083,350 A | * | 1/1992 | Sandreid | 24/134 R |
| 5,156,240 A | * | 10/1992 | Ostrobrod | 188/65.1 |
| 5,265,696 A | * | 11/1993 | Casebolt | 182/8 |

(Continued)

FOREIGN PATENT DOCUMENTS

AU 2008201955 2/2009

(Continued)

*Primary Examiner* — Terrell McKinnon
*Assistant Examiner* — Daniel J Breslin
(74) *Attorney, Agent, or Firm* — King & Spalding LLP

(57) ABSTRACT

An adjustment assembly to quickly and efficiently adjust the length of a lanyard used in conjunction with aircraft umbilical connector release mechanisms. The lanyard cable includes at least two retaining mechanisms spaced apart thereon. The adjustment assembly includes a cam portion that retains one of the retaining mechanisms when in the locked position, and allows movement of the retaining mechanisms through the adjustment assembly when in the released position. The cable length can be adjusted when in the released position.

11 Claims, 9 Drawing Sheets

U.S. PATENT DOCUMENTS

| | | | | |
|---|---|---|---|---|
| 5,323,873 | A * | 6/1994 | Pelofi | 182/4 |
| 5,638,919 | A * | 6/1997 | Pejout | 182/192 |
| 5,855,251 | A * | 1/1999 | Deuer | 182/5 |
| 5,924,522 | A * | 7/1999 | Ostrobrod | 182/191 |
| 6,019,195 | A * | 2/2000 | Pelofi | 182/192 |
| 6,095,502 | A * | 8/2000 | Dodge, Jr. | 254/389 |
| 6,948,594 | B2 * | 9/2005 | Hossler | 188/65.1 |
| 7,165,295 | B2 * | 1/2007 | DeWitt et al. | 24/132 WL |
| 7,222,840 | B1 * | 5/2007 | Stepper | 254/391 |
| 2006/0054386 | A1 | 3/2006 | Blackford et al. | |
| 2006/0283315 | A1 | 12/2006 | Blackburn | |

FOREIGN PATENT DOCUMENTS

| | | |
|---|---|---|
| DE | 102004016623 | 12/2005 |
| GB | 2293193 | 3/1996 |

* cited by examiner

ADJUSTABLE LENGTH LANYARD

CROSS-REFERENCE TO RELATED APPLICATIONS

This application claims priority to U.S. Provisional Application Ser. No. 61/160,516, titled "Variable Length Lanyard," filed on Mar. 16, 2009, which is incorporated by reference in its entirety.

TECHNICAL FIELD

The present invention relates generally to variable length lanyards. More particularly, the present invention is directed to a device or assembly for adjusting the length of a lanyard used in conjunction with aircraft umbilical connector release mechanisms.

BACKGROUND OF THE INVENTION

An aircraft carrying an ordinance, such as a weapon, typically utilizes an umbilical connector and a single loop contiguous lanyard for release of the ordinance. The connector interfaces between the ordinance and a lanyard cable, and the lanyard cable is looped around an aircraft mounted post, also known as a "bail bar."

The ordinance mounts to the connector using a receptacle on the ordinance. The spatial orientation of the receptacle can vary from one ordinance to the next. Accordingly, the spatial orientation with respect to the bail bar varies from one ordinance to the next. As a result, problems may arise if there is too much slack in the lanyard. For example, impulse loading can occur on the lanyard cable, and the lanyard may break or the connector may be damaged. In addition, too much or too little slack in the lanyard may affect the release of the ordinance, or in the case of no slack, cause premature in-flight actuation of the connector.

Most conventional lanyard designs do not allow for variations in the distance between the ordinance and the bail bar. Therefore, a number of lanyards having different lengths may be needed, so the lanyards are switched out based on the ordinance being utilized. The drawback to this conventional design is the difficulty for a user to quickly change the lanyard to suit a specific ordinance.

Therefore, a need exists for a device or mechanism that allows a user to quickly adjust the length of a lanyard and is easy to use.

SUMMARY OF THE INVENTION

Adjustment devices and systems described herein allow quick and efficient adjustment of a lanyard cable length. In one aspect, an adjustment assembly or device for a cable having at least two retaining mechanisms can include a base panel and four side walls defining a housing and arranged in a rectangular shape to form an interior cavity within the housing, a cover for covering the interior cavity, a cam device positioned in the interior cavity and coupled to the housing, and an elastic member, such as a spring, coupled to the housing and the cam device. One of the side walls and another opposing side wall each include an opening having a width or diameter that is greater than the width or diameter of the retaining mechanisms. The cover is slidably coupled to the housing, and is movable between a first position and a second position with respect to the housing. The cam device can be rotatably coupled to the housing by a cam pin. The rotation of the cam device within the interior cavity can be limited by a load pin. The cam device includes a stop mechanism, such as a recess, for retaining the cable, and a channel for receiving the elastic member. The elastic member is movable between a normal state and an extended state, and the cam device is movable between a locked position and an unlocked or released position. When the cover is in the first position, the elastic member is in the normal state, the cam device is in the locked position, and the stop mechanism prevents one of the retaining mechanisms from exiting the housing. The elastic member can be coupled to the cam device by a release pin that engages the cover when the cover is in the second position, and causes rotation of the cam device to the unlocked position. When the cover is in the second position, the elastic member is in the extended state, the cam device is in the unlocked position, and the retaining mechanisms are able to pass through the openings in the side walls and the interior cavity and the cable length can be adjusted.

In another aspect, a system is defined that includes an adjustment assembly of the present invention, and a cable having at least two retaining mechanisms extending through the housing of the adjustment assembly. The retaining mechanisms can be shaped like a ball. The openings in the side walls of the housing have a diameter that is greater than the diameter of the ball retaining mechanisms. When the adjustment assembly is in the locked position, one of the retaining mechanisms is retained within the housing and the cable is prevented from passing therethrough. When the adjustment assembly is in the unlocked or released position, the retaining mechanisms can pass through the housing and the cable length can be adjusted.

These and other aspects, objects, and features of the invention will become apparent to those having ordinary skill in the art upon consideration of the following detailed description of exemplary embodiments exemplifying the best mode for carrying out the invention as presently perceived.

DESCRIPTION OF INVENTION

A device described herein adjusts the length of a lanyard used in conjunction with release of an ordinance from an aircraft connector system. The device is generally capable of handling stresses associated with adjustment of the lanyard length. Generally, the device allows a user to quickly and easily adjust the length of a lanyard without the use of any tools.

Figure 1:
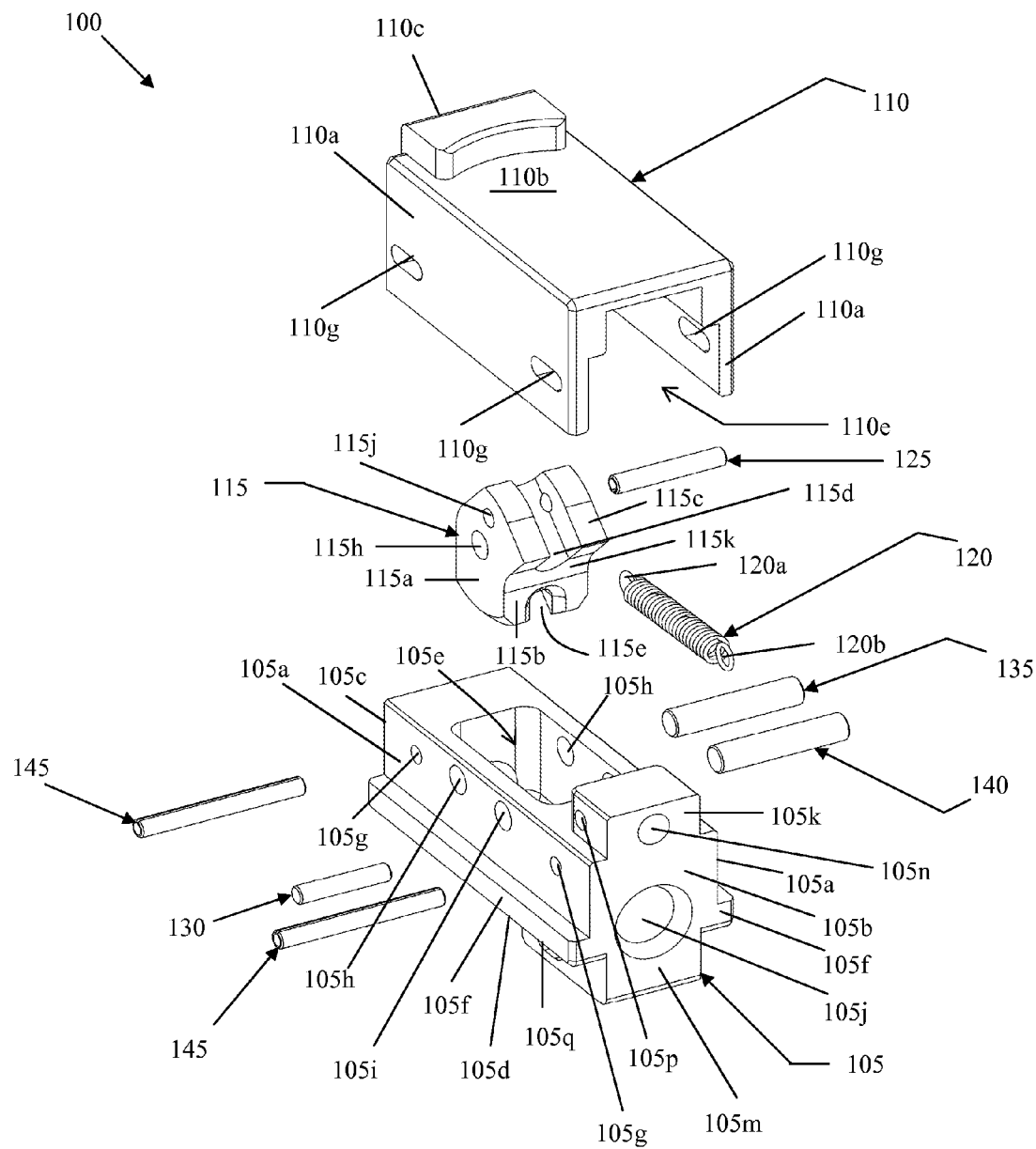
FIG. 1 is an exploded view of a device for adjusting the length of a lanyard, according to an exemplary embodiment.

FIG. 1 is an exploded view showing the components of a device 100 for adjusting the length of a lanyard (not shown), according to an exemplary embodiment. The device 100 includes a housing 105. The housing 105 includes two side walls 105a, a bottom wall 105b, a top wall 105c, a base wall 105d, and a cavity 105e. Each of the side walls 105a includes an extension 105f extending along a length from the bottom wall 105b to the top wall 105c. Each side wall 105a also includes two holes 105g having a first diameter and two holes 105h, 105i having a second diameter. Each of the holes 105g are positioned on opposite sides of the holes 105h, 105i.

The bottom wall 105b includes an aperture 105j sized appropriately to receive a retaining mechanism, such as a swaged ball, on a lanyard cable (not shown). The bottom wall 105b also includes a first portion 105k and a second portion 105m that extend past the side walls 105a of the housing 105. The first portion 105k includes a hole 105n extending from the bottom wall 105b towards the top wall 105c. The first portion 105k also includes a hole 105p extending a direction from one side wall 105a to the other side wall 105a. The second portion 105m includes an aperture 105q for coupling the device 100 to a connector (not shown).

The device 100 includes a cover 110 configured to couple to the housing 105. The cover 110 includes two side walls 110a, an upper wall 110b, a top wall 110c, and an opening 110e. The opening 110e is configured to receive the side walls 105a and the first portion 105k of the housing 105 such that the cover 110 rests on the extensions 105f on the housing 105. Each of the side walls 110a includes two slots 110g that align with holes 105g when the cover 110 is coupled to the housing 105. In certain embodiments, the housing 105 and the cover 110 are fabricated from aerospace grade aluminum, or any other suitable lightweight material.

The device 100 also includes a cam portion 115. The cam portion 115 includes two angled side walls 115a, a bottom wall 115b, and a top wall 115c. The top wall 115c includes a channel 115d extending lengthwise and parallel to the side walls 115a. The channel 115d is configured to receive a spring 120. The bottom wall 115b includes a recess 115e configured to receive a lanyard cable (not shown), but the recess 115e has a width that is smaller than the diameter of a swaged ball (not shown) on the lanyard cable. The cam portion 115 includes a hole 115h having a diameter similar to hole 105h of the housing 105. The cam portion 115 also includes holes 115j having a different diameter. The holes 115h, 115j extend from one side wall 115a to the other side wall 115a. The cam portion 115 further includes an angled pivot slot 115k formed by the angled side walls 115a.

The device 100 further includes a spring 120. The spring 120 includes a looped first end 120a and a looped second end 120b. A release pin 125 couples the first end 120a of the spring 120 to the cam portion 115 via holes 115j. Once assembled, the release pin 125 extends past the side walls 115a of the cam portion 115 and into a groove (not shown) in the cover 110. The spring 120 is positioned within the channel 115d upon assembly of the device 100. The second end 120b of the spring 120 is positioned into hole 105n and coupled to hole 105p in the housing 105 via a dowel pin 130.

The cam portion 115 is positioned within the cavity 105e of the housing 105. The cam portion 115 is coupled to the housing 105 by a cam pin 135. The cam pin 135 extends through holes 105h of the housing 105 and hole 115h of the cam portion 115. The cam portion 115 is rotatable within the housing 115 upon the cam pin 135. A load pin 140 extends through holes 105i of the housing 105 and rests within the angled pivot slot 115k of the cam portion 115. Once assembled, the load pin 140 restricts movement of the cam portion 115 to about 60 degrees.

The cover 110 is coupled to the housing 105 by cover pins 145. The cover pins 145 extend through holes 105g of the housing 105 and slots 110g of the cover 110. Once the cover 110 is coupled to the housing 105, the cover pins 145 allow the cover 110 to move between a first position (FIG. 2) and a second position (FIG. 5) via slots 110g of the cover.

The cam portion 115, the spring 120, the release pin 125, the dowel pin 130, the cam pin 135, the load pin 140, and the cover pins 145 are fabricated from corrosion-resistant steel, stainless steel, or any other suitable corrosion resistant material capable of withstanding the pulling force of a lanyard.

Figure 2:
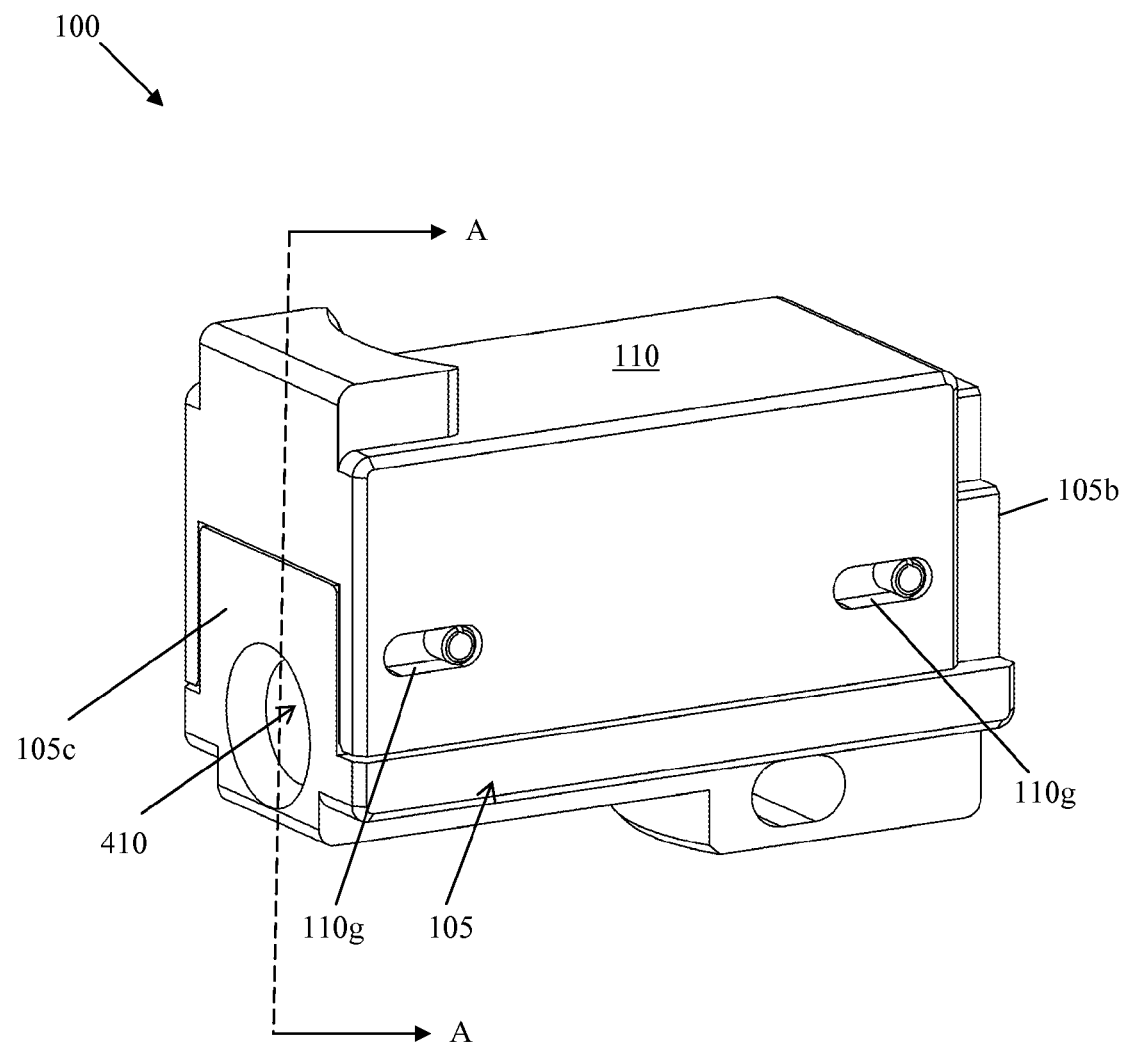
FIG. 2 is a perspective view of the device for adjusting the length of a lanyard shown in FIG. 1, in an assembled state in a released position, according to an exemplary embodiment.
Figure 3:
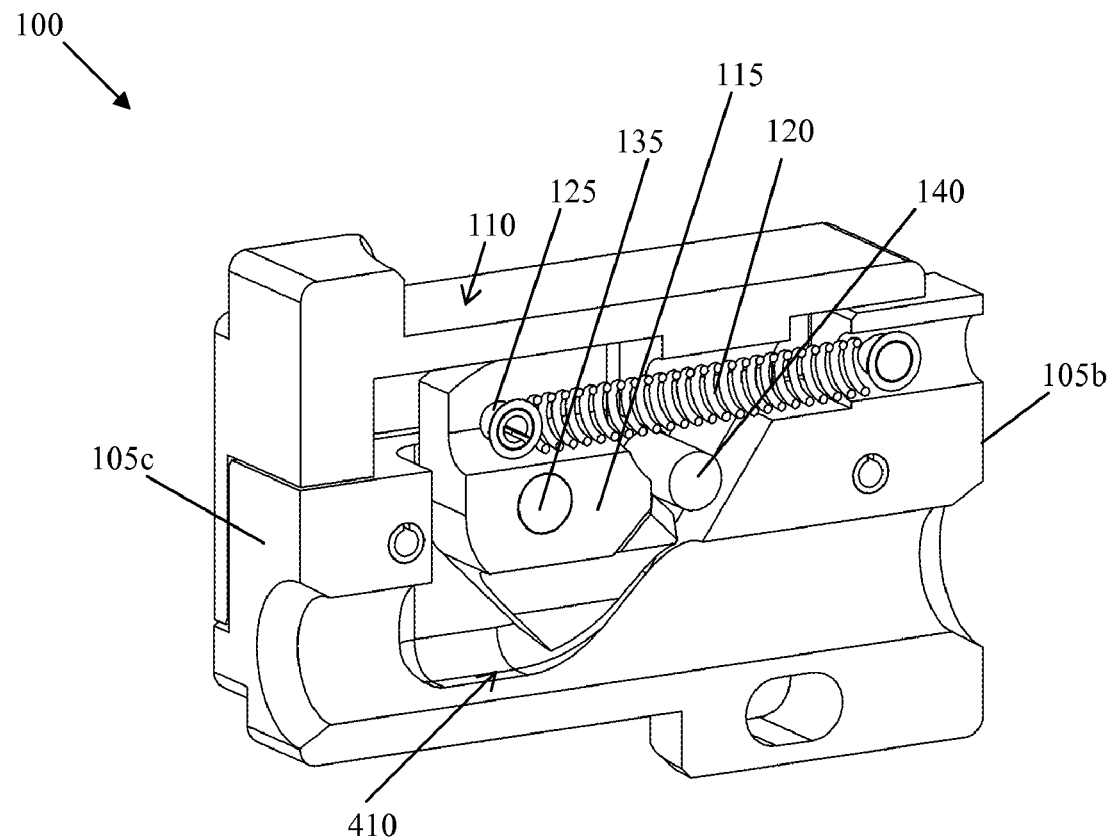
FIG. 3 is a perspective sectional view of the assembled device for adjusting the length of a lanyard shown in FIG. 2, in a released position, according to an exemplary embodiment.
Figure 4:
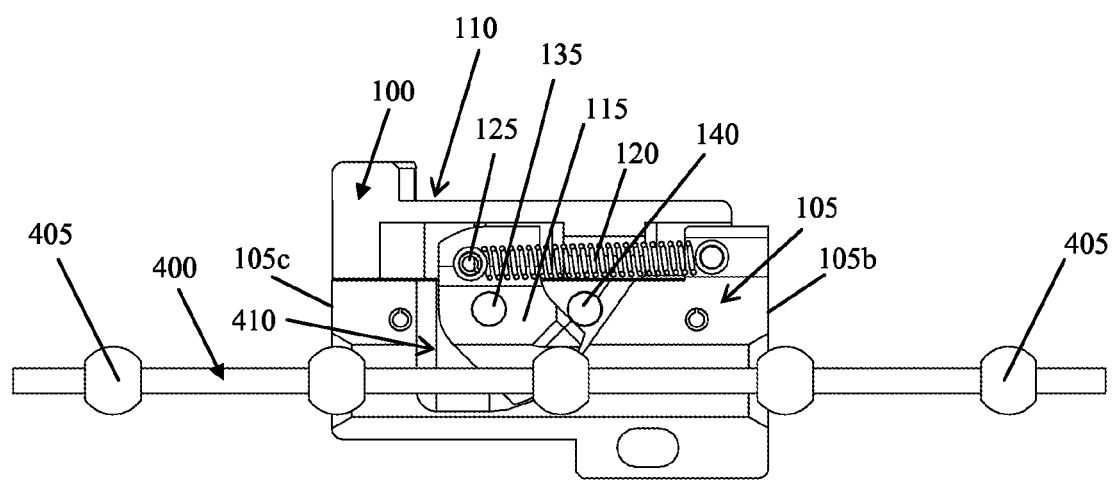
FIG. 4 is a side cross-sectional view of the assembled device for adjusting the length of a lanyard shown in FIG. 2, in a released position and having a lanyard cable disposed therein, according to an exemplary embodiment.

FIG. 2 is a perspective view of the device 100 assembled and in a released position, according to an exemplary embodiment. FIG. 3 is a perspective sectional view, through a line A-A in FIG. 2, of the device 100 assembled and in the released position, according to an exemplary embodiment. FIG. 4 is a side cross-sectional view of the device 100 assembled and in the released position, and having a lanyard cable 400 disposed therein, according to an exemplary embodiment. With respect to FIG. 4, the lanyard cable 400 includes a number of swaged balls 405. In certain embodiments, the cable 400 has a diameter of about 1/16 inch and the swaged balls 405 have a diameter of about 0.19 inch. In certain embodiments, the lanyard cable 400 includes six swaged balls 405, each spaced apart along the cable 400 and separated by a distance of about 5/8 inch. In this configuration, the lanyard cable 400 can be adjusted up to about three inches. One having ordinary skill in the art will recognize that the diameter of the cable 400 and swaged balls 405 can be modified so long as the diameter of the swaged balls 405 is greater than the diameter of the cable 400. In addition, the swaged balls 405 can be spaced apart on the cable 400 any distance suitable for a particular application.

With respect to FIGS. 2-4, in the released position, the cover 110 is shifted in a direction from the bottom wall 105b towards the top wall 105c of the housing 105. As a result, the cover 110 catches the release pin 125 and shifts the cam portion 115 in a counterclockwise direction about the cam pin 135. The rotation of the cam portion 115 is limited partly by the extension of the spring 120 and the length of the slots 110g of the cover 110. In addition, the load pin 140 also limits rotation of the cam portion 115 about pin 135 within the housing 105. When the cam portion 115 is shifted, an opening 410 is created such that the cable 400 having the swaged balls 405 can freely move within. A user can adjust the length of the cable 400 in this released position by moving the cable 400 to a desired position.

Figure 5:
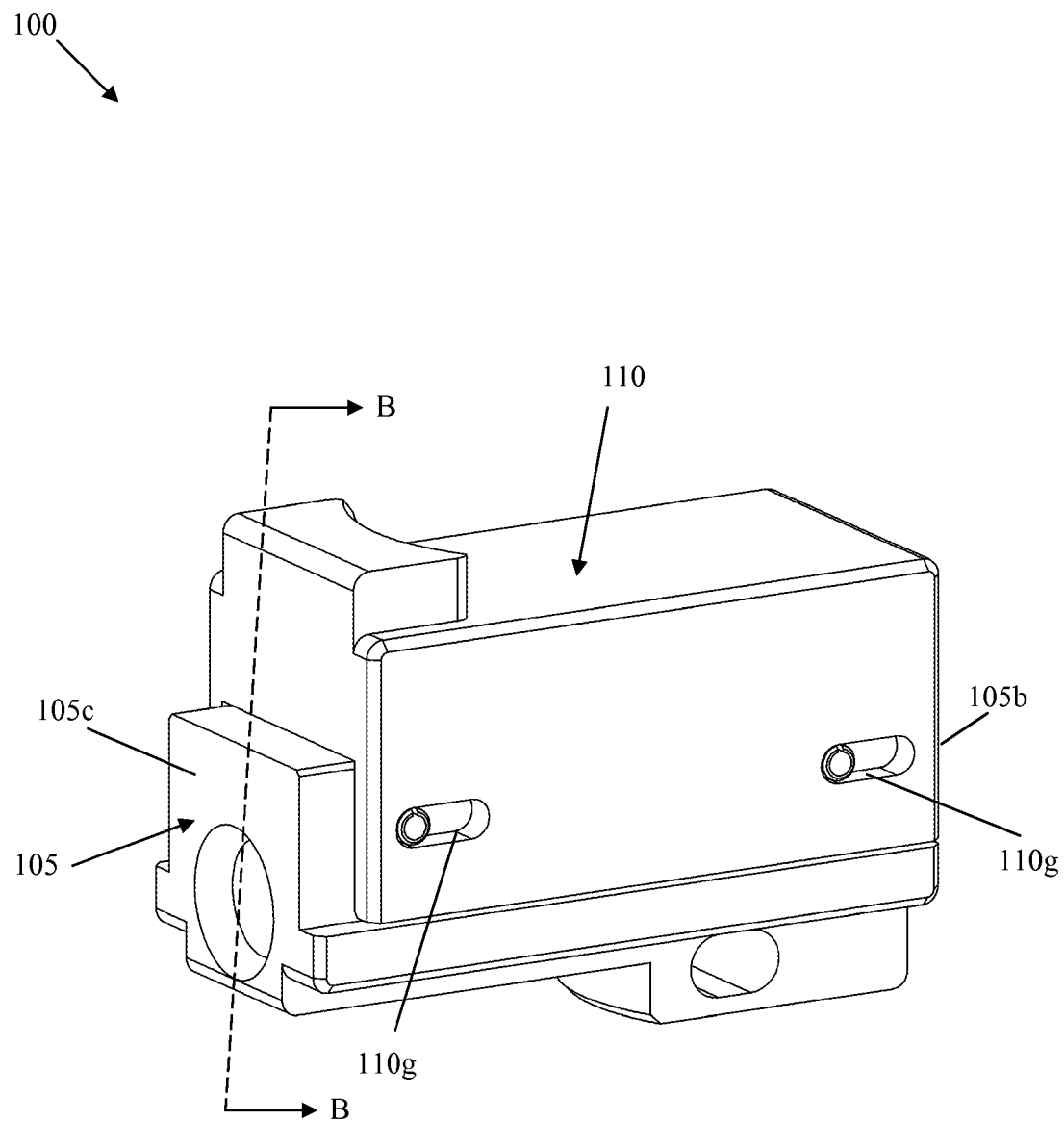
FIG. 5 is a perspective view of the device for adjusting the length of a lanyard shown in FIG. 1, in an assembled state in a locked position, according to an exemplary embodiment.
Figure 6:
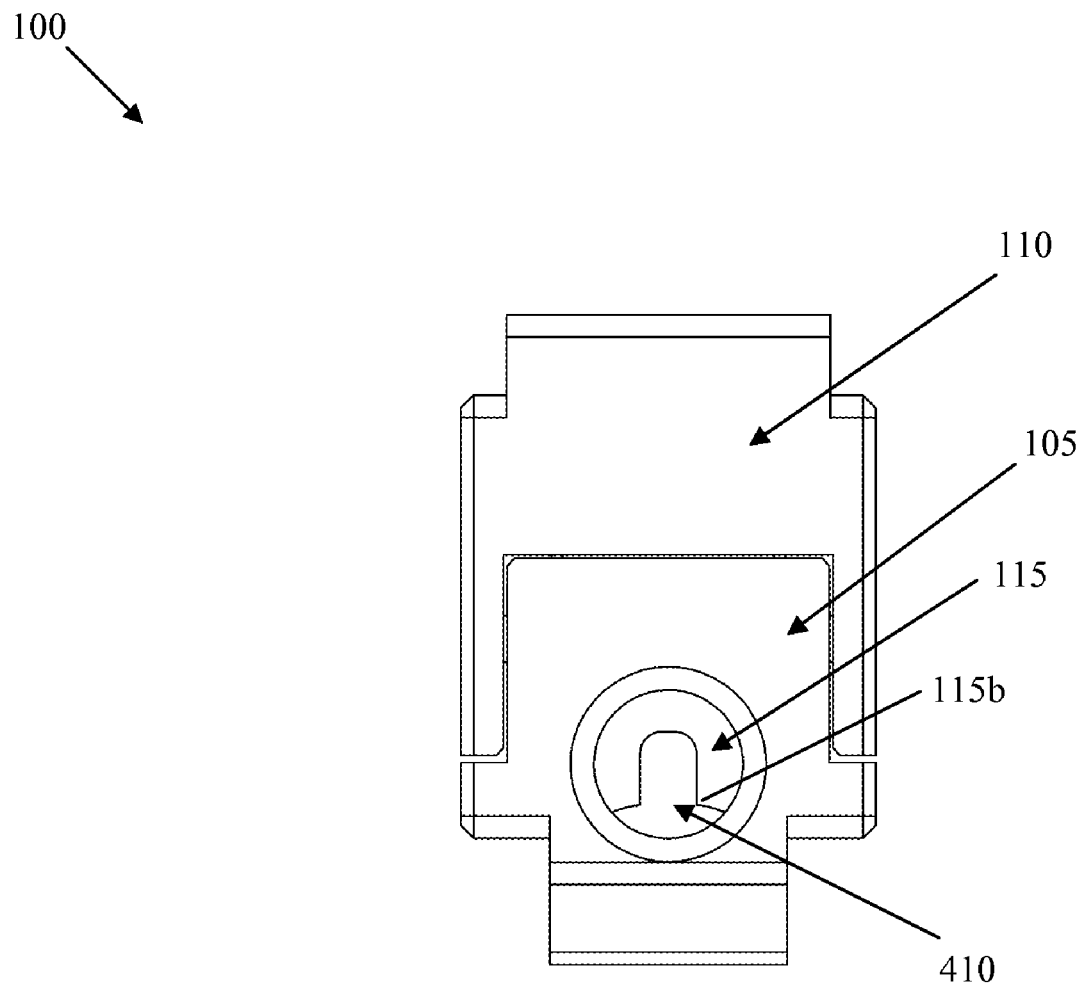
FIG. 6 is a bottom view of the assembled device for adjusting the length of a lanyard shown in FIG. 5, in a locked position, according to an exemplary embodiment.
Figure 7:
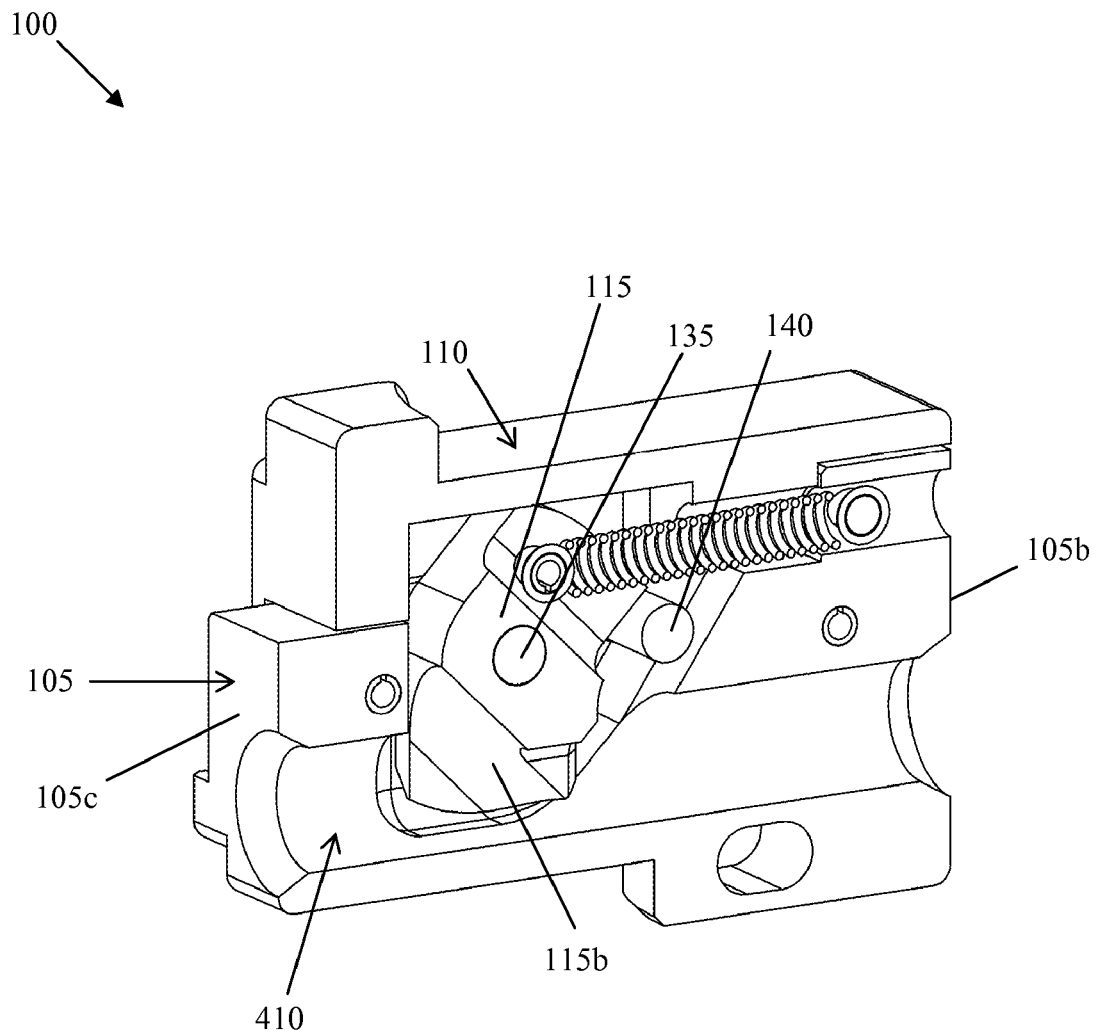
FIG. 7 is a perspective sectional view of the assembled device for adjusting the length of a lanyard shown in FIG. 5, in a locked position, according to an exemplary embodiment.
Figure 8:
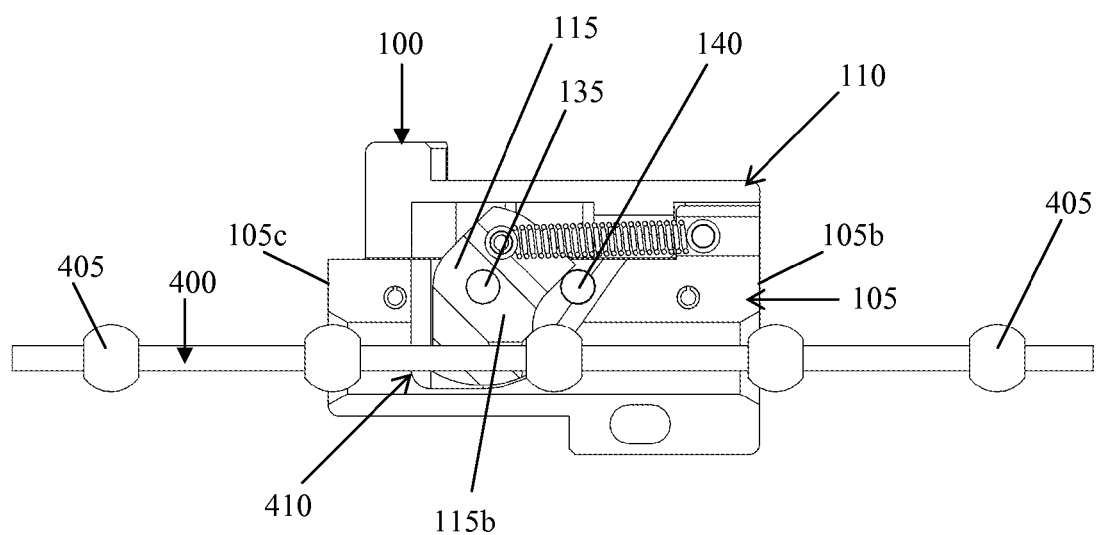
FIG. 8 is a side cross-sectional view of the assembled device for adjusting the length of a lanyard shown in FIG. 5, in a locked position and having a lanyard cable disposed therein, according to an exemplary embodiment.

FIG. 5 is a perspective view of the device 100 assembled and in a locked position, according to an exemplary embodiment. FIG. 6 is a bottom view of the device 100 assembled and in the locked position, according to an exemplary embodiment. FIG. 7 is a perspective sectional view, through a line B-B in FIG. 5, of the device 100 assembled and in the locked position, according to an exemplary embodiment. FIG. 8 is a side cross-sectional view of the device 100 assembled and in the locked position, and having the lanyard cable 400 disposed therein, according to an exemplary embodiment.

With respect to FIGS. 5-8, in the locked position, the cover 110 is shifted in a direction from the top wall 105c towards the bottom wall 105b of the housing 105. As a result, the cam portion 115 is rotated in a clockwise direction about the cam pin 135. The rotation of the cam portion 115 is limited partly by the length of the slots 110g of the cover 110 and the presence of the load pin 140. When the cam portion 115 is in this position, the bottom wall 115b extends into opening 410. The cable 400 is positioned within the recess 115e of the bottom wall 115b of the cam portion 115, but the swaged balls 405 are restricted from moving therein. Once a user has obtained a suitable length of lanyard, the user can locked the device 100 such that the position of the cable 400 cannot be adjusted until the device 100 is in a released position.

Figure 9:
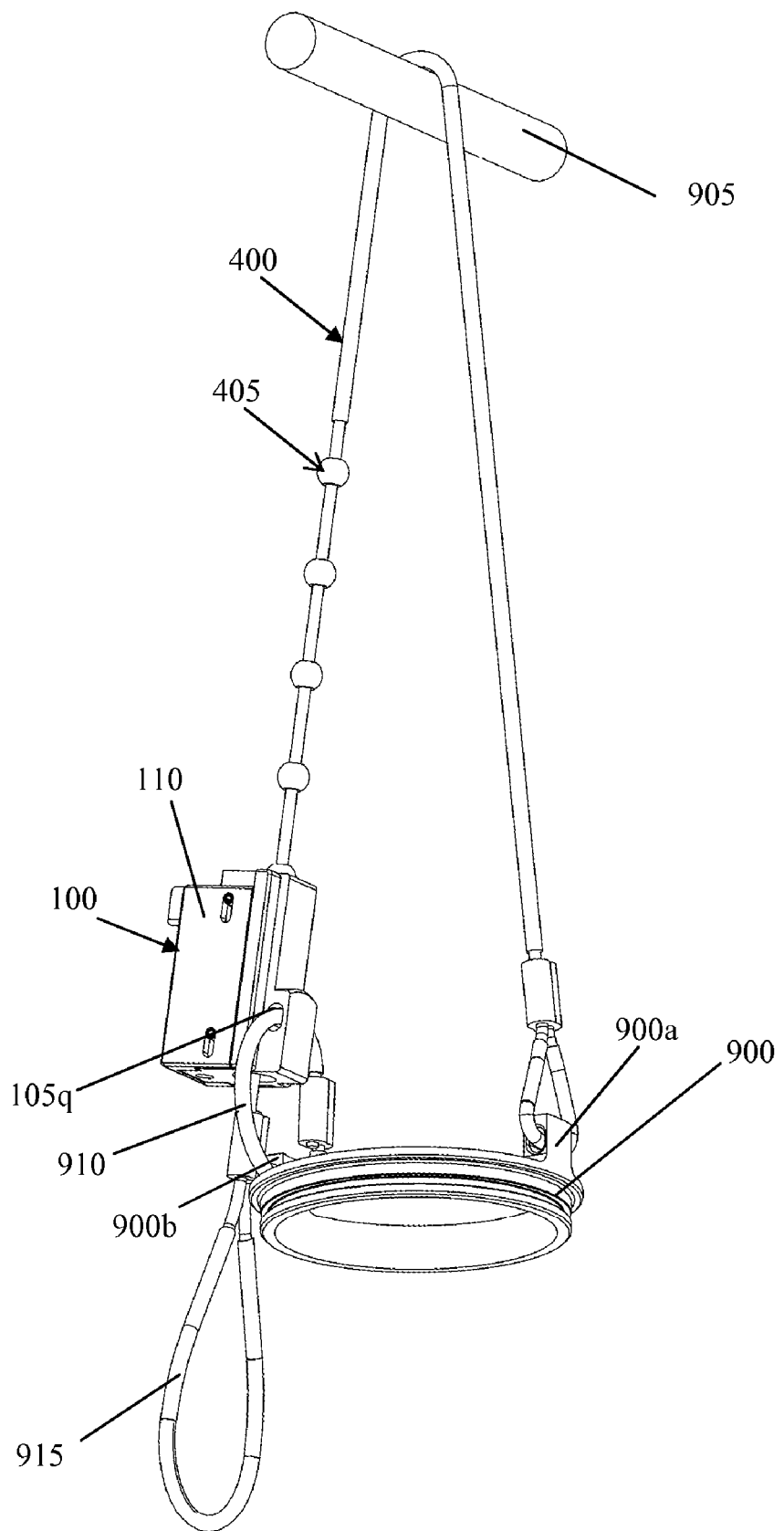
FIG. 9 is a perspective view of the device for adjusting the length of a lanyard shown in FIG. 1, in an assembled state, and coupled to a lanyard and a connector, according to an exemplary embodiment.

FIG. 9 is a perspective view of the device 100 assembled and coupled to the lanyard cable 400 and a lanyard ring 900 of a connector (not shown), according to an exemplary embodiment. The device 100 is coupled to a bail bar 905 via a loop in the lanyard cable 400. The cable 400 having swaged balls 405 extends through the device 100 and is coupled to a first end 900a of the lanyard ring 900. The device 100 is coupled to a second end 900b of the lanyard ring 900 via connecting ring 910 and aperture 105q. The connector attached to the lanyard ring 900 is coupled to an ordinance (not shown) to be released. Based on the ordinance coupled to the connector, the length of the lanyard cable 400 can be adjusted via simply shifting the cover 110, positioning an alternate swaged ball 405 within the device 100 by way of an end loop 915 of the lanyard cable 400, and locking the device 100. Therefore, the devices of the present invention allow a user to quickly and easily adjust the length of a lanyard cable.

Generally, to adjust the length of a lanyard that is positioned within the opening 410 of the device 100, a user can shift the cover 110 to the released position (FIGS. 2-4). In the released position, the cam portion 115 is rotated such that the opening 410 allows both the cable 400 and swaged balls 405 to move therethrough. A user can make the lanyard longer or shorter by shifting the cable 400 to a desired position. To increase the length of the lanyard, the user pulls the cable 400 in a direction from the device 100 towards the bail bar 905. To decrease the length of the lanyard, the user moves the cable 400 in a direction from the bail bar 905 towards the device 400 by pulling on the end loop 915. The user can adjust the cable 400 to a desired length of the lanyard and then allow the spring 120 to shift the cover 110 to the locked position (FIGS. 5-8). Once the cover 110 is in the locked position, the cam portion 115 rotates such that the bottom wall 115b extends into the opening 410 and prevents the swaged balls 405 from moving therethrough. As a result, the cable 400 is locked into place and the desired length of lanyard achieved.

Any spatial references herein, such as, for example, "top," "bottom," "upper," "lower," "above", "below," "rear," "between," "vertical," "angular," "beneath," etc., are for purpose of illustration only and do not limit the specific orientation or location of the described structure.

Many modifications, features, and embodiments of the invention will become evident to those of ordinary skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes may be made therein without departing from the spirit and scope of the invention. It should also be understood that the invention is not restricted to the illustrated embodiments and that various modifications can be made.

What is claimed is:

1. An adjustable length cable assembly system comprising:
   an adjustment assembly comprising:
      a housing having a first opening and a second opening positioned on opposing end walls of the housing, the housing having an extension from a side wall of the housing along a length of the housing in a direction between the end walls, the housing defining an interior cavity;
      a cover for covering the interior cavity, the cover including a slot to slidably couple the cover to the housing with a cover pin, a portion of the cover disposed upon the extension, wherein the cover is slidably movable along the extension between a first position and a second position with respect to the housing;
      a cam device positioned within the interior cavity and coupled to the housing, wherein the cam device includes a stop mechanism, wherein the cam device is movable between a locked position and a released position; and
   a cable having at least two retaining mechanisms spaced apart thereon, the cable extending through the first and second openings and the interior cavity;
   wherein when the cover is in the first position, the cam device is in the locked position and the stop mechanism retains one of the retaining mechanisms in place within the housing, wherein when the cover is in the second position, the cam device is in the released position and the first and second openings and the interior cavity provide a passageway to allow the retaining mechanisms to pass therethrough.

2. The adjustable length cable assembly system of claim of claim 1, further comprising an elastic member having a first end and a second end, wherein the first end of the elastic member is coupled to the housing and the second end of the elastic member is coupled to the cam device, wherein the elastic member is movable between a normal state and an extended state, wherein when the cover is in the first position, the elastic member is in the normal state, and wherein when the cover is in the second position, the elastic member is in the extended state.

3. The adjustable length cable assembly system of claim 2, wherein the cam device further comprises a channel, wherein the elastic member is positioned at least partially within the channel.

4. The adjustable length cable assembly system of claim 2, wherein the second end of the elastic member is coupled to the cam device by a release pin.

5. The adjustable length cable assembly system of claim 4, wherein when the cover is in the second position, the cover engages the release pin and causes rotation of the cam device to the released position.

6. The adjustable length cable assembly system of claim 1, wherein the retaining mechanism is a ball.

7. The adjustable length cable assembly system of claim 6, wherein the openings in the first and second walls are circular and have a diameter greater than a diameter of the ball.

8. The adjustable length cable assembly system of claim 1, wherein the cam device is coupled to the housing by a cam pin, and wherein the cam device is rotatable about the cam pin.

9. The adjustable length cable assembly system of claim 1, further comprising a load pin positioned adjacent to the cam device within the interior cavity, wherein the load pin restricts full rotation of the cam device.

10. The adjustable length cable assembly system of claim 1, wherein the stop mechanism is a recess in the cam device, wherein the recess has a width that is less than a width of said retaining mechanism.

11. An adjustment device for a cable having at least two retaining mechanisms spaced apart thereon, the adjustment device comprising:
- a housing having a base panel and a plurality of walls that define an interior space,
  - wherein each of the walls comprises a first edge, a second opposing edge, and a substantially planar member disposed between the first and second edge,
  - wherein the first edge is disposed adjacent to the base panel and each wall extends out from the base panel in a substantially orthogonal direction,
  - wherein the plurality of walls comprises a first wall, a second wall opposing the first wall, two side walls extending from the first wall to the second wall, and an opening positioned in each of the first wall and the second wall,
  - wherein the openings are aligned, and
  - wherein the openings are sized to allow said retaining mechanisms to pass therethrough;
- a cover including a slot to slidably couple the cover to the housing and the cover covering the interior space, wherein the cover is movable along the slot between a first position and a second position with respect to the housing;
- a spring having a first end and a second end, wherein the first end of the spring is coupled to the housing; and
- a cam portion positioned within the interior space and rotatably coupled to the housing,
  - wherein the cam portion includes a channel and a recess,
  - wherein the spring is positioned at least partially within the channel,
  - wherein the second end of the spring is coupled to the cam portion,
  - wherein the spring is movable between a normal state and an extended state,
  - wherein the cam portion is movable between a locked position and an unlocked position, wherein the recess is sized to receive said cable,
  - wherein the recess is sized to prevent said retaining mechanism from being positioned therein when the cam portion is in the locked position,
  - wherein when the cover is in the first position, the spring is in the normal state and the cam portion is in the locked position, and
  - wherein when the cover is in the second position, the spring is in the extended state and the cam portion is in the unlocked position to provide a passageway allowing the retaining mechanisms to pass through the openings and the interior space.

* * * * *